United States Patent
Pasqua et al.

(10) Patent No.: US 8,645,032 B2
(45) Date of Patent: Feb. 4, 2014

(54) METHOD FOR ELECTRONICALLY CONTROLLING A BICYCLE GEARSHIFT AND ELECTRONICALLY SERVO-ASSISTED BICYCLE GEARSHIFT

(75) Inventors: Paolo Pasqua, Camisano Vicentino VI (IT); Alberto Bortoli, Arcugnano VI (IT)

(73) Assignee: Campagnolo S.R.L., Vicenza (IT)

( * ) Notice: Subject to any disclaimer, the term of this patent is extended or adjusted under 35 U.S.C. 154(b) by 0 days.

(21) Appl. No.: 13/560,540

(22) Filed: Jul. 27, 2012

(65) Prior Publication Data

US 2013/0030662 A1    Jan. 31, 2013

(30) Foreign Application Priority Data

Jul. 28, 2011 (EP) .................................... 11425204

(51) Int. Cl.
*B62M 11/00* (2006.01)
*B62M 25/08* (2006.01)

(52) U.S. Cl.
USPC .......................................... 701/51; 280/260

(58) Field of Classification Search
USPC ................... 701/51, 52, 55, 64; 280/260, 261
See application file for complete search history.

(56) References Cited

U.S. PATENT DOCUMENTS

| | | | |
|---|---|---|---|
| 4,960,402 A * | 10/1990 | Klein et al. | 474/80 |
| 6,679,797 B2 | 1/2004 | Valle | |
| 6,834,876 B2 * | 12/2004 | Fukuda | 280/261 |
| 6,988,739 B2 | 1/2006 | Guderzo et al. | |
| 7,373,232 B2 * | 5/2008 | Guderzo | 701/51 |
| 2007/0213908 A1 * | 9/2007 | Guderzo et al. | 701/51 |
| 2009/0204299 A1 | 8/2009 | Miglioranza | |

FOREIGN PATENT DOCUMENTS

| | | |
|---|---|---|
| EP | 1426284 A1 | 6/2004 |
| EP | 2088071 A1 | 8/2009 |

OTHER PUBLICATIONS

European Search Report for Appln. No. 11425204.2-1254, dated Dec. 21, 2011.

* cited by examiner

*Primary Examiner* — Mary Cheung
*Assistant Examiner* — Rodney Butler
(74) *Attorney, Agent, or Firm* — Volpe and Koenig, P.C.

(57) ABSTRACT

A method for electronically controlling a bicycle gearshift by detecting a first actual command value of an actuator such as to position a motion transmission chain in engagement with a first of at least three coaxial toothed wheels, and a second actual command value of the actuator such as to position the chain in engagement with a second of said toothed wheels. For each toothed wheel, there is determined a nominal command value of the actuator theoretically such as to position the chain in engagement with said toothed wheel. Computing an actual command value of said actuator at least for each of said toothed wheels other than the first and second toothed wheel, based on said nominal command values and on said first and second actual command value. An electronically servo-assisted bicycle gearshift having modules adapted to implement the above method is also disclosed.

12 Claims, 4 Drawing Sheets

Figure 1:
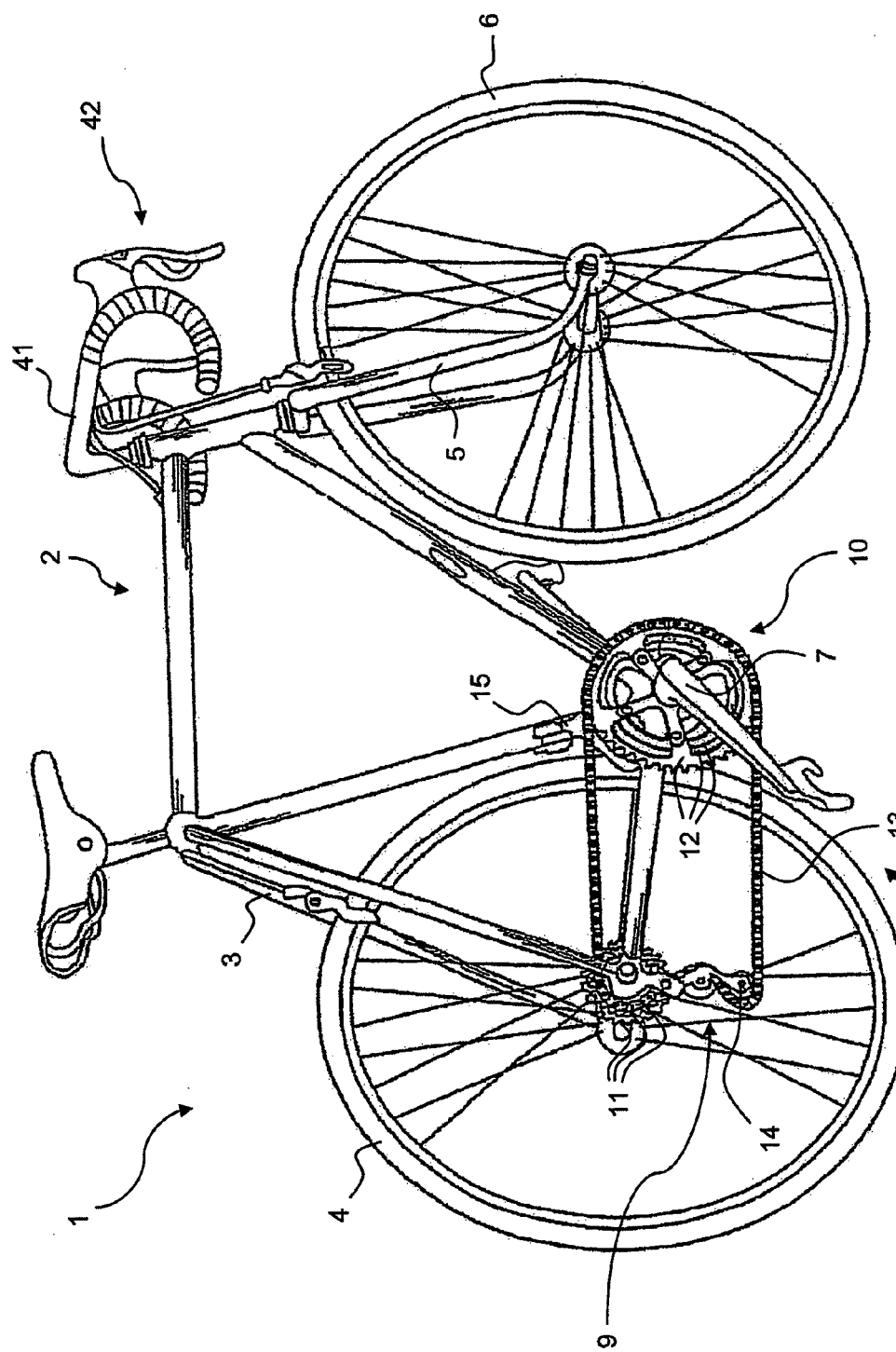

| i 70 | $H_i$ |
|---|---|
| 1 | $H_1$ |
| 2 | $H_2$ |
| 3 | $H_3$ |
| 4 | $H_4$ |
| 5 | $H_5$ |
| 6 | $H_6$ |
| 7 | $H_7$ |
| 8 | $H_8$ |
| 9 | $H_9$ |
| 10 | $H_{10}$ |
| 11 | $H_N = H_{11}$ |

| i | $Q_i$ |
|---|---|
| 1 | $Q_1$ |
| 2 | $Q_2$ |
| 3 | $Q_3$ |
| 4 | $Q_4$ |
| 5 | $Q_5$ |
| 6 | $Q_6$ |
| 7 | $Q_7$ |
| 8 | $Q_8$ |
| 9 | $Q_9$ |
| 10 | $Q_{10}$ |
| 11 | $Q_N=Q_{11}$ |

Fig. 3

| i | $H_i$ |
|---|---|
| 1 | $H_1$ |
| 2 | $H_2$ |
| 3 | $H_3$ |
| 4 | $H_4$ |
| 5 | $H_5$ |
| 6 | $H_6$ |
| 7 | $H_7$ |
| 8 | $H_8$ |
| 9 | $H_9$ |
| 10 | $H_{10}$ |
| 11 | $H_N=H_{11}$ |

Fig. 4

| i | $G_i$ |
|---|---|
| 1 | $G_1$ |
| 2 | $G_2$ |
| 3 | $G_3$ |
| 4 | $G_4$ |
| 5 | $G_5$ |
| 6 | $G_6$ |
| 7 | $G_7$ |
| 8 | $G_8$ |
| 9 | $G_9$ |
| 10 | $G_{10}$ |
| 11 | $G_N=G_{11}$ |

Fig. 5

| i | $S_i$ |
|---|---|
| 1 | $S_1$ |
| 2 | $S_2$ |
| 3 | $S_3$ |
| 4 | $S_4$ |
| 5 | $S_5$ |
| 6 | $S_6$ |
| 7 | $S_7$ |
| 8 | $S_8$ |
| 9 | $S_9$ |
| 10 | $S_{10}$ |
| 11 | $S_N=S_{11}$ |

Fig. 6

| i | $K_i$ |
|---|---|
| 1 | $K_1$ |
| 2 | $K_2$ |
| 3 | $K_3$ |
| 4 | $K_4$ |
| 5 | $K_5$ |
| 6 | $K_6$ |
| 7 | $K_7$ |
| 8 | $K_8$ |
| 9 | $K_9$ |
| 10 | $K_{10}$ |
| 11 | $K_N=K_{11}$ |

Fig. 7

METHOD FOR ELECTRONICALLY CONTROLLING A BICYCLE GEARSHIFT AND ELECTRONICALLY SERVO-ASSISTED BICYCLE GEARSHIFT

FIELD OF INVENTION

The present invention relates to a method for electronically controlling a bicycle gearshift, and to an electronically servo-assisted bicycle gearshift.

BACKGROUND

A motion transmission system in a bicycle comprises a chain extending between toothed wheels associated with the axis of the pedal cranks and with the hub of the rear wheel. When at least one of the axis of the pedal cranks and the hub of the rear wheel there is more than one toothed wheel, and the motion transmission system is therefore equipped with a gearshift, a front derailleur and/or a rear derailleur are provided for. In the case of an electronically servo-assisted gearshift, each derailleur comprises a chain guide element, also known as cage, mobile to move the chain among the toothed wheels in order to change the gear ratio, and an electromechanical actuator to move the chain guide element. The actuator in turn typically comprises a motor, typically an electric motor, coupled with the chain guide element through a linkage such as an articulated parallelogram, a rack system or a worm screw system, as well as a sensor of the position, speed and/or acceleration of the rotor or of any other moving part downstream of the rotor, down to the chain guide element itself. It is worthwhile noting that slightly different nomenclatures to that used in this context are also in use.

Control electronics changes the gear ratio automatically, for example based on one or more detected variables, such as the travel speed, the cadence of rotation of the pedal cranks, the torque applied to the pedal cranks, the slope of the travel terrain, the heart rate of the cyclist and similar, and/or based on commands manually input by the cyclist through suitable command members, for example levers and/or buttons.

In order to control the actuator, instead of assuming that the toothed wheels are equally axially spaced and therefore moving the chain guide element always by the same amount, the control electronics uses a table of values containing, for each toothed wheel, the value that a variable of the derailleur must take up to position the chain in engagement with the toothed wheel. Such a value can be a differential value with respect to the adjacent toothed wheel, or it can be an absolute value with respect to a reference, for example with respect to a reference toothed wheel or to an end of stroke condition or to a condition of lack of excitation of the motor.

From the point of view of magnitude, the command value of the actuator can for example be the distance traveled by a mobile point taken as a reference on the derailleur, the number of steps or revolutions that the motor should be made to perform, a length of excitation time of the motor, the value of a supply voltage of a motor having an excursion proportional to the voltage, furthermore it can be the value emitted by the sensor associated with the motor, a numerical value stored in a register and representative of one of the aforementioned quantities, etc.

The values of said table are nominal values, set in the factory, which take the number of toothed wheels in the gearshift group (front or rear) and the respective thicknesses and pitches into account. Typically, such nominal values provide that, in the absence of the driving signal of the actuator, namely with command value at zero, the chain is in engagement with the toothed wheel having the smallest diameter, although as can be seen from the aforementioned examples, this condition is not necessary.

In one known electronically servo-assisted gearshift, a setting operating mode, an adjustment operating mode, and a normal ride mode are implemented. In the setting mode, the chain is brought into alignment with a single preselected toothed wheel, preferably the one having the smallest diameter, and a biunique correspondence is set between the physical position of the actuator and the logic value associated with the gear ratio relative to the predetermined toothed wheel, preferably zeroing a counter to which content the nominal values of the table are related. In the adjustment mode, the chain is brought in engagement and alignment with a predetermined toothed wheel, and an adjustment variable ("offset") of the logic value associated with the gear ratio relative to the predetermined toothed wheel is set. During the normal ride mode, the actuator is moved into physical positions determined by the logic values associated with the toothed wheels as adjusted by the adjustment variables. In this way, misalignments between the chain and one or more toothed wheels are compensated, caused for example by impacts or collisions or by small differences between the size of a replaced toothed wheel and the replacement one.

SUMMARY

The Applicant observes that the setting at a single toothed wheel can only minimally obviate the various differences in geometry and manufacturing tolerances of the gearshift and of the mechanical components on which the gearshift is mounted, in particular the geometry and size of the frame and the thickness of the fork of the gearshift, while adjustment through offset at each toothed wheel is a rather long and complex operation.

The technical problem at the basis of the invention is to quickly and efficiently adapt the nominal command values of a bicycle gearshift to a real bicycle gearshift, possibly mounted, so as to take the manufacturing and assembly tolerances of the gearshift itself, as well as the geometry of the bicycle, into account.

In a first aspect thereof, the invention concerns a method for electronically controlling a bicycle gearshift, comprising the steps of:

a) detecting a first actual command value of an actuator such as to position a motion transmission chain in engagement with a first of at least three coaxial toothed wheels, and a second actual command value of the actuator such as to position the chain in engagement with a second of said toothed wheels, b) for each toothed wheel, determining a nominal command value of the actuator theoretically such as to position the chain in engagement with said toothed wheel, and c) computing an actual command value of said actuator at least for each of said toothed wheels other than the first and second toothed wheel, based on said nominal command values and said first and second actual command value.

Using two toothed wheels as a reference, it is possible to take into account not only the size differences of the components of the frame and the mounting tolerances of the gearshift, but also the size differences inside the assembly of toothed wheels with respect to the theoretical reference gearshift on which the nominal values are based, still with a relatively quick operation.

It is possible to use any numerical representation of the command values, nominal and actual, which is representative of the condition in which the chain is in such a physical position as to engage on a specific toothed wheel.

As stated above, the command values are values that a variable of the derailleur must take up to position the chain in engagement with the toothed wheel, wherein such a value can be a differential value with respect to the adjacent toothed wheel, or it can be an absolute value with respect to a reference, for example with respect to a reference toothed wheel or to an end of stroke condition or to a condition of lack of excitation of the motor. In terms of magnitude, the command value of the actuator can for example be the distance travelled by a mobile point taken as a reference on the derailleur, the number of steps or revolutions that the motor should be made to perform, a length of excitation time of the motor, the value of a supply voltage of a motor having an excursion proportional to the voltage, furthermore it can be the value emitted by the sensor associated with the motor, a numerical value stored in a register and representative of one of the aforementioned quantities, etc.

Moreover, the nominal values are meant as referring to a reference gearshift.

Preferably, the step of determining a nominal command value of the actuator comprises reading a table of values from a memory.

Preferably, the command values, nominal and actual, are represented with a numerical representation with proportional scale.

Preferably, said computation of the actual command values is carried out by imposing that the difference in actual command values associated with a pair of toothed wheels is proportional to the difference in the nominal command values associated with said pair of toothed wheels.

In this way, a linear transformation of the nominal into the actual values is carried out.

Preferably, the proportionality constant is equal to the ratio between the difference in actual command values associated with said first and said second toothed wheel and the difference in nominal command values associated with said first and said second toothed wheel.

Preferably, said first toothed wheel is the toothed wheel with the smallest diameter or the one immediately adjacent thereto and/or said second toothed wheel is the toothed wheel with the largest diameter or the one immediately adjacent thereto.

By selecting toothed wheels on which to carry out the detection of the actual condition of the actuator that are at or near to the two ends of the assembly of toothed wheels, actual command values are obtained for the other toothed wheels that allow a more precise positioning of the chain. Indeed, as the distance between the two reference toothed wheels increases, the resolution of the measurement increases and the measurement error becomes smaller in percentage terms.

By further selecting such toothed wheels as the penultimate ones from the respective end of the assembly of toothed wheels, the further advantage of making it easier to visually detect the correct positioning of the chain is obtained, by having two toothed wheels on both sides of the one on which the detection is carried out.

Advantageously, the origin of the reference system for the nominal command values and the origin of the reference system for the actual command values are selected at said first toothed wheel.

Such a provision allows the computations to be simplified, since the difference in command values, nominal and actual, associated with said first and said second toothed wheel coincides with the command value, nominal and actual respectively, associated with the second toothed wheel.

Therefore, there can be at least one step of normalizing the nominal or actual command values, respectively.

Preferably said step c) comprises the steps of:

d) computing, for each toothed wheel possibly excluding said first and said second toothed wheel, the ratio between (i) the difference between the nominal command value associated with it and the nominal command value associated with the toothed wheel immediately preceding it assumed to be equal to zero in the case of absence of a toothed wheel immediately preceding it, and (ii) the difference in nominal command values associated with said second and said first toothed wheel;

e) computing, for each toothed wheel possibly excluding said first and said second toothed wheel, the algebraic sum between (i) the actual command value associated with the toothed wheel immediately preceding it assumed to be equal to zero in the case of absence of a toothed wheel immediately preceding it, and (ii) the product between the ratio computed in step d) and the difference between the actual command values associated with said second and said first toothed wheel detected in step a).

Preferably, the various aforementioned steps are comprised in a setting or adjustment operating mode of the gearshift, while in a ride operating mode, the electronic controlling method comprises the step of actuating a gearshifting by commanding the actuator according to one of said actual command values after their computation.

Advantageously, the method comprises the step, in the ride operating mode, of actuating a gearshifting by commanding the actuator according to one of said nominal command values in the absence of a valid set of said actual command values.

In a second aspect thereof, the invention concerns an electronically servo-assisted bicycle gearshift, comprising:
  a chain and toothed wheels system for transmitting motion from the axle of the pedal cranks to a driving wheel of the bicycle, said motion transmission system comprising at least three coaxial toothed wheels along an axis selected among the axle of the pedal cranks and the axis of the driving wheel,
  at least one derailleur comprising a chain guide element and an actuator of the chain guide element to displace the chain into engagement with a preselected toothed wheel of said at least three coaxial toothed wheels, and
  control electronics comprising modules adapted to implement the method outlined above.

Preferably, said actuator comprises a direct current brush motor driven by a suitable number of "steps", each corresponding to a fraction of a revolution, more preferably to one thirty-secondth of a revolution.

In a third aspect thereof, the invention concerns a derailleur comprising a chain guide element and an actuator of the chain guide element to displace a chain into engagement with a preselected toothed wheel of at least three coaxial toothed wheels, and control electronics comprising modules adapted to implement the method outlined above.

In a fourth aspect thereof, the invention concerns a bicycle comprising an electronically servo-assisted bicycle gearshift as described above.

BRIEF DESCRIPTION OF THE DRAWING(S)

Figure 2:
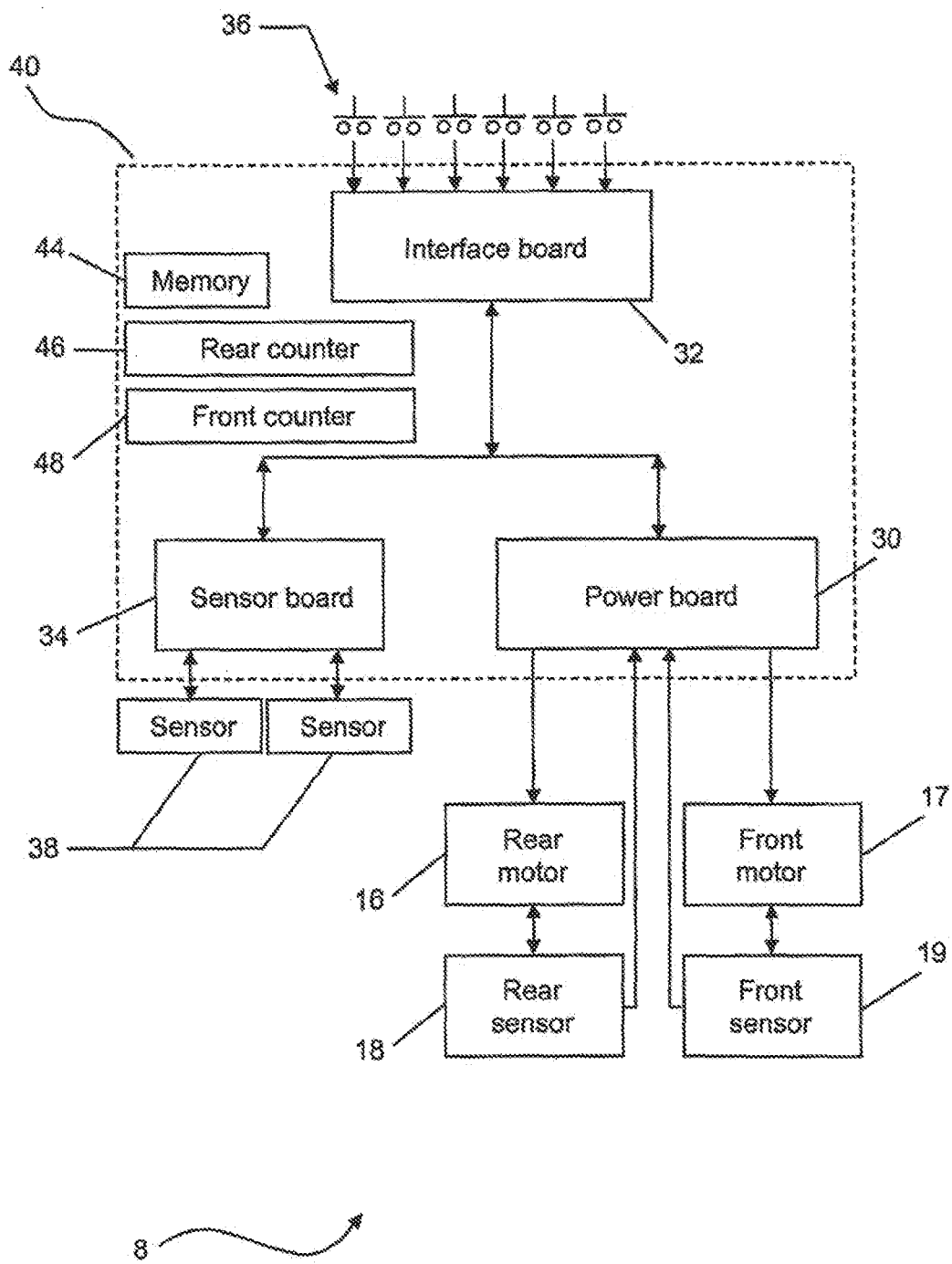
Figure 8:
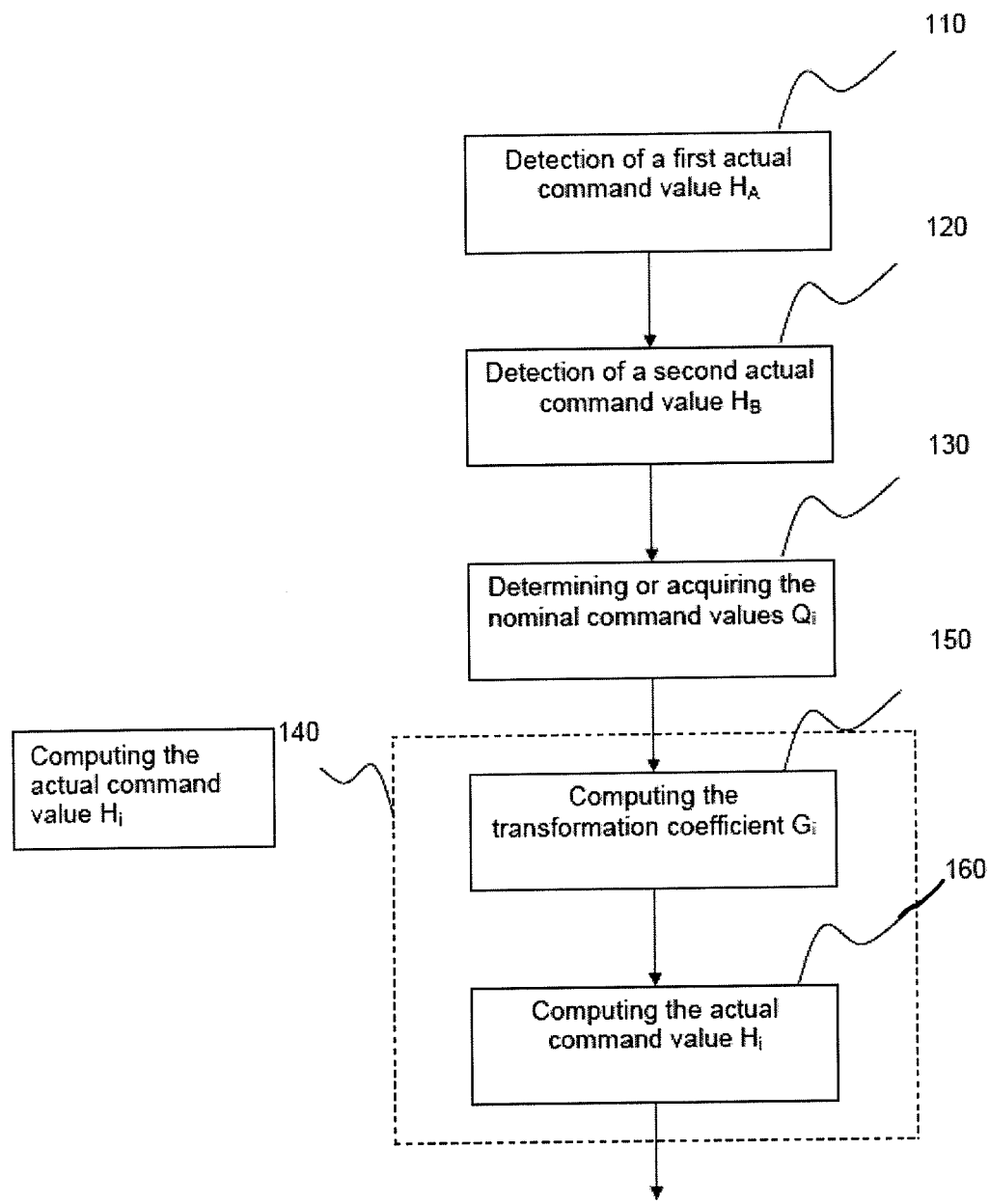

Further features and advantages of the present invention will become clearer from the following detailed description of some preferred embodiments thereof, made with reference to the attached drawings. In the drawings:

FIG. 1 schematically illustrates a perspective view of a bicycle equipped with an electronically servo-assisted gearshift according to the present invention, FIG. 2 illustrates a block diagram of the electrical and electronic part of the electronically servo-assisted gearshift according to an embodiment of the present invention, FIGS. 3 to 7 schematically illustrate different data structures used according to the present invention, FIG. 8 illustrates an exemplary flow chart of a preferred setting mode of the gearshift according to the method of the invention.

DESCRIPTION OF THE PREFERRED EMBODIMENT(S)

With reference to FIG. 1, a bicycle 1, in particular a racing bicycle, includes a frame 2 formed in a known way of tubular elements defining a bearing structure 3 for a rear wheel 4 and a fork 5 for a front wheel 6. A handlebar 41 having a tubular structure is operatively connected to the fork 5 and to the frame 2.

The frame 2, at its lower portion, bears an axle of the pedal cranks or pedal unit 7, of the conventional type, to actuate the rear wheel 4 through an electronically servo-assisted gearshift according to the invention, indicated in general with reference numeral 8.

Gearshift 8 comprises a rear gearshift group 9 and a front gearshift group 10. Rear gearshift group 9 includes a plurality of toothed wheels or sprockets 11 having different diameters and coaxial with the rear wheel 4. Front gearshift group 10 includes a plurality of toothed wheels or crowns or gearwheels 12, having different diameters and coaxial with the axle of the pedal cranks 7.

The toothed wheels 11 of the rear gearshift group 9 and the toothed wheels 12 of the front gearshift group 10 can be selectively engaged by a closed loop motion transmission chain 13, to provide for the different gear ratios available, through the electronically servo-assisted gearshift 8.

The different gear ratios can be obtained by moving a chain guide element of a rear derailleur 14 of the rear gearshift group 9 and/or a chain guide element of a front derailleur 15 of the front gearshift group 10.

In the respective derailleur 14, 15, the rear chain guide element and the front chain guide element are moved by a respective electric motor 16, 17 (FIG. 2), typically equipped with a reducer and associated with the chain guide element through an articulated parallelogram kinematism. Alternatively it is possible to use other types of motor or other types of actuator that are well known in the art, for example a rack or worm screw system, for example the one described in U.S. Pat. No. 6,679,797, incorporated herein by reference.

The derailleurs 14, 15 typically comprise a respective position, speed and/or acceleration sensor 18, 19 (FIG. 2). The sensor can be associated with the rotor of the motor 16, 17, or with any mobile part "downstream" of the rotor, down to the chain guide element itself.

The details of the construction of the derailleurs 14, 15 are not illustrated here since the present invention lies outside their specific construction. For more details, reference shall be made for example to the description of the above cited patent applications and patents.

FIG. 2 represents, in the form of a block diagram, the electrical and electronic part of the electronically servo-assisted gearshift according to an embodiment of the present invention.

An electronic power unit or board 30, equipped with a battery, provides the electrical power supply to the motors 16, 17 and to the sensors 18, 19 of the derailleurs 14, 15, to an electronic board referred to hereinbelow as interface board or unit 32, and possibly to an electronic board referred to hereinbelow as sensor board or unit 34. The battery is preferably of the rechargeable type, and the rear derailleur 14 can, in a per se known way, include a dynamo-electric unit to recharge the battery.

The electronic power board 30, the interface unit 32 and the sensor unit 34 as a whole form an electronic controller 40 of the electronically servo-assisted gearshift 8. Alternatively there can be a single electronic board or a different number of electronic boards.

In the present description and in the attached claims, therefore, under electronic controller or control electronics 40 a logic unit shall be meant, which can however be formed of many physical units, in particular of one or more distributed microprocessors that can be contained for example in the electronic power board 30, in the interface unit 32 and/or in the sensor unit 34.

The electronic power board 30 is housed for example in one of the tubes of the handlebar 41 or in one of the tubes of the frame 2, for example at a support for a drinking bottle (not shown). The interface unit 32 is housed for example in one of the tubes of the handlebar 41 or in a grippable device 42 mounted on it. The sensor board 34 is housed for example in one of the tubes of the frame 2, near to the sensors associated therewith.

The transfer of power, data and information among the various components is carried out through electrical cables, advantageously housed inside the tubes of the frame 2. The transfer of data and information signals can also take place in wireless mode, for example with Bluetooth protocol.

During travel, the rear and front derailleurs 14, 15 are controlled by the electronic controller 40 based on upward or downward gearshifting request signals established by manual command devices 42, or semi-automatically or automatically by the electronic controller 40 itself. The manual command devices 42 can for example comprise levers or buttons suitable for switching the state of switches 36 connected to or arranged on the interface unit 32. The switches 36 can be directly actuatable or each through a lever, or two buttons can be actuatable by a swing lever.

Typically, there are levers or buttons arranged on or near to a handgrip of the handlebar 41 for the upward and downward gearshifting signals, respectively, of the rear gearshift group 9, and levers or buttons (FIG. 2) arranged on or near to the other handgrip of the handlebar 41 for the upward and downward gearshifting signals, respectively, of the front gearshift group 10. Typically, there are also levers or buttons for actuating one or more of the switches 36, which are intended to command auxiliary functions, like for example the selection of an operating mode.

In the gearshift 8, the electronic controller 40 and more specifically the sensor unit 34 also preferably has one or more sensors 38 of travel parameter, such as the travel speed, the speed of rotation of the pedal cranks, the slope of the travel terrain, the heart rate of the cyclist and similar, associated therewith.

In an embodiment, the electronic controller 40, in order to actuate a gearshifting, actuates the motor 16, 17 and, based on the signal of the sensor 18, 19, stops the motor 16, 17 when the desired gear ratio has been reached, namely when the chain guide element of the derailleur 14 or 15 has reached such a position as to allow the correct engagement of the chain 13 with the desired toothed wheel 11 or 12, for example the adjacent wheel (having a larger or smaller diameter, respectively) to the one at which it was located when the (upward or downward, respectively), gearshifting command was generated through the manual command device 42 and the switch 36, and/or by the electronic control unit 40, based on the output of the sensors 38. The desired toothed wheel may not be adjacent to the starting toothed wheel, in the case of a multiple gearshifting.

In an alternative embodiment, the motors 16, 17 are driven for a time or with an appropriate value for each upward or downward gearshifting, and then stopped automatically, while the sensors 18, 19 are only optionally present and in such a case are used to provide a feedback signal to the electronic controller 40 so that it can possibly take care of once again actuating the motors 16, 17 in case the physical position that brings the chain 13 in engagement with the desired toothed wheel 11 or 12 has not been reached. This can for example be caused by the fact that the resisting torque offered by the derailleur 14, 15, which is to a certain extent dependent on how the cyclist is pedalling, was too high, greater than the maximum torque which can be delivered by the motors.

The motors 16, 17 can for example be stepper motors. Preferably, the motors 16, 17 are direct current brush motors that are driven by a suitable number of "steps", each corresponding to a fraction of a revolution, more preferably to one thirty-secondth of a revolution. The selection of such a fraction is advantageous for processing, since it is an integer multiple of 2.

The electronic controller 40 further comprises memory means 44, based on which the electronic controller 40 determines (in the ways explained later on with reference to FIGS. 3-6) the command values of the actuators such as to position the chain 13 in engagement with the desired toothed wheels 11, 12 on each occasion.

The electronic controller 40 can implement a rear counter 46 and a front counter 48. The counters 46, 48 can for example each be made of a register or of a variable stored in a memory cell. The electronic controller 40, in the normal ride operating mode of the gearshift 8, drives the derailleurs 14, 15 and keeps track of their current position by increasing or decreasing the counters 46, 48, for example by one unit for each step imposed on the motor 16, 17, and/or based on the reading of the sensors 18, 19. The counters 46, 48, where provided for, express the current position of the derailleurs 14, 15 in the same measurement unit as the command values stored in the memory means 44.

The memory means 44 of the command values, and the counters 46, 48 are shown as self-standing parts of the electronic controller 40, but they can be physically implemented in one or more of the memory devices present in the electronic boards 30, 32, 34.

In simpler bicycles, there can be only the rear gearshift group 9 or only the front gearshift group 10, with simplifications to the above that will be manifest to those skilled in the art.

For easiness of explanation, hereinafter only the rear gearshift group will be referred to. The following is applicable, alternatively or additionally, to the front gearshift group, mutatis mutandis.

FIG. 3 illustrates a data structure, stored in a memory area of the electronic controller 40, like for example the aforementioned memory 44, or in any case accessible to it, in which the nominal command values $Q_i$ of the actuator are stored in the form of a table 60, with i being an integer number between 1 and N, for each toothed wheel or sprocket of a gearshift group. In the example case of a rear gearshift group containing eleven sprocket, the table comprises the nominal command values from $Q_1$ to $Q_{11}$.

More specifically, the nominal command value $Q_1$ represents, in a suitable measurement unit, the theoretical condition of a standard or reference gearshift in which the chain is in such a physical position as to engage on the sprocket having the smallest diameter of the rear gearshift group; the nominal command value $Q_2$ represents the condition, in the same measurement unit, in which the chain is in such a physical position as to engage on the sprocket adjacent thereto of the rear gearshift group; etc. up to the nominal command value $Q_N$—in the case illustrated $Q_{11}$—which represents the condition, again in the same measurement unit, in which the chain is in such a physical position as to engage on the sprocket having a maximum diameter of the rear gearshift group.

The nominal command values $Q_i$ are preferably stored in the factory.

For example, each nominal command value $Q_i$ can be expressed as a value, possibly stored in the counter 46, which the output of the sensor 18 must take up, or as the value of a drive amount of the motor 16.

For example, when the actuator comprises a stepper motor or a motor driven by fractions of a revolution as stated above, each nominal command value $Q_i$ can be expressed as the number of steps necessary to reach the condition of engagement with the i-th toothed wheel, starting from a reference position, corresponding for example to an end of stroke position, or to the condition of lack of excitation of the motor 16, or to the condition of engagement with the toothed wheel having the smallest diameter.

Each nominal command value $Q_i$ can also be expressed as the position of a specific point of the actuator or of the chain guide element, or as the distance of such a point, for example in millimeters, from a reference plane, for example taken on the bicycle or in the condition of engagement with a reference toothed wheel. Furthermore, each nominal command value $Q_i$ can be expressed as the value of a power supply voltage of a motor 16 that causes a movement of the chain 13 proportional thereto, or in other ways, according to the type of actuator, as will be understood by those skilled in the art.

Each nominal command value $Q_i$ can also be expressed in a differential manner, with reference to the adjacent toothed wheel, for example as the distance to travel, as the number of steps to carry out, as the actuation time of the actuator etc., according to the type of actuator, as will be understood by those skilled in the art. In this case, for each toothed wheel there will, more specifically, be a nominal command value starting from the toothed wheel having an immediately smaller diameter, and a nominal command value starting from the toothed wheel having an immediately greater diameter, the changes to be made to what follows being within the capabilities of those skilled in the art. In an even more elaborate embodiment, there can be, for each toothed wheel and for each direction from which it is reached, a nominal command value based on which to bring the chain temporarily for the engagement operation, and a nominal command value based on which to bring the chain upon successful engagement.

For the sake of easiness, reference shall be made to the case of nominal command values $Q_i$ expressed in a proportional measurement unit.

Table 60 of FIG. 3 also indicates a field i having values from 1 to N, in this particular case from 1 to 11. However, it should be understood that in a practical implementation, this field can be absent should the nominal command values $Q_i$ be stored sorted by diameter of the corresponding toothed wheel. Indeed, the table 60 will be looked at, as better described hereinafter, each time obtaining a specific value $Q_i$ based on the value of a current index i=1 ... N. If the values $Q_i$ are sorted, it will therefore be sufficient to look at the i-th value in the table 60.

FIG. 4 illustrates an analogous data structure, also stored in a memory area of the electronic controller 40 or in any case accessible thereto, for example in the memory 44, in which the actual command values $H_i$, with i being an integer number between 1 and N, for each toothed wheel or sprocket 11 of the rear gearshift group 9 are stored in the form of a table 70. In the case illustrated of a rear gearshift group 9 containing eleven sprockets, the table comprises the actual command values from $H_1$ to $H_{11}$.

Although in FIG. 2 a single memory 44 is shown schematically, it should be understood that in practice there can be various storage devices. Preferably, the table 60 of nominal values $Q_i$ is stored in an EEPROM memory or in a read only memory, for example a ROM, while the table 70 of actual values $H_i$ is stored in the same or in another EEPROM memory or in a read and write memory.

The actual command values $H_i$ are obtained, by the electronic controller 40 and in a setting operating mode, from the nominal command values $Q_i$ as described hereinafter. During a normal ride operating mode, should it be necessary to carry out a gear change bringing the chain 13 to engage the i-th toothed wheel, the electronic control unit reads from table 70 the actual command value $H_i$ associated with the i-th toothed wheel, and drives the actuator, and in particular the motor 16, as a consequence.

Before the setting operating mode has been carried out, or when the electronically servo-assisted gearshift 8 is reset for whatever reason, or also if for whatever other reason the actual command values $H_i$ are not validly set, during the normal ride operating mode the electronic controller 40 can read the nominal command value $Q_i$ from table 60, and drive the actuator as a consequence. Alternatively, in such cases it can be provided to copy one-off the nominal command values $Q_i$ from table 60 as actual command values $H_i$ into table 70, and again access table 70 to carry out gearshifting.

The setting mode is selected with a suitable command, like for example a special combination of the manual command devices 42 that actuate switches 36.

Also with reference to FIG. 8, in such a setting operating mode, firstly, in a step 110, a detection of a first actual command value $H_A$ is carried out, such as to position the motion transmission chain 13 in engagement with a first preselected toothed wheel, referred to hereinafter as A-th toothed wheel. The motor 16 is actuated, preferably at low speed and/or with small movements of the chain guide element, in any case less than the distance between two adjacent toothed wheels 11, until the operator is satisfied with the position reached by the chain 13.

In particular, in case the motor 16 is of the stepper type or of the type actuated by "steps" each equivalent to a fraction of a revolution as stated above, it is driven to move by one step at a time or, if one wishes to obtain a faster adjustment, by a certain number of steps at a time. Preferably, the movement of the actuator during the setting mode is commanded through the same manual commands 42 that are used to command gearshiftings in the normal ride operating mode, in automatic or semi-automatic operation.

The setting mode is usually carried out in the workshop with the bicycle mounted on the stand. A first procedure is that of keeping the bicycle still, moving exclusively the chain guide element forwards and backwards and stopping when it is judged, "by sight", that the optimal positioning has been obtained. The positioning by sight can be improved with various provisions, either mechanical and/or electronic. It is possible, for example, to mount a plate on one of the idle small toothed wheels of the rear derailleur 14 (and/or on the front derailleur 15), so that there is correct positioning when it touches the A-th toothed wheel preselected for setting. Otherwise, a laser diode can be mounted on the small wheel and a laser light receiver can be mounted on the A-th toothed wheel or vice-versa. In order to further improve the positioning, it is possible to exploit the "triangulation" of light, etc. A second procedure is that of actuating the chain 13 through the pedal crank unit 7, and of checking the correct positioning "by ear". An expert user, indeed, manages to perceive that at the best positioning there is also the least noise. Clearly, it is possible to combine the two procedures and check the correct positioning using both eye and ear.

When the operator finishes actuating the manual command devices 42 and/or actively indicates, for example with a suitable combination of the manual command devices 42, that there is the correct positioning between the chain 13 and the A-th toothed wheel, the electronic controller 40 acquires the current command value of the actuator and stores it in the A-th record of the table 70.

The first A-th toothed wheel on which the setting mode is carried out is preferably the one with the smallest diameter or even more preferably the one immediately adjacent thereto—in other words the second—, but it can be provided for to give the operator the choice of the first A-th toothed wheel on which to carry out the setting mode. In this case, the electronic controller 40 will ask the operator to specify the toothed wheel 11 on which the setting mode is carried out or has been carried out, or it will infer it from the comparison between the first actual command value $H_A$ and the nominal command values $Q_i$.

In a step 120, in a totally analogous manner to what is stated above, a detection of a second actual command value $H_B$ is then carried out, such as to position the motion transmission chain 13 in engagement with a second preselected toothed wheel 11, referred to hereinafter as B-th toothed wheel. The second actual command value $H_B$ is stored in the B-th record of table 70.

The second B-th toothed wheel on which the setting mode is carried out is preferably the one with the greatest diameter, or even more preferably the one immediately adjacent thereto—namely the penultimate one—, but it can be provided for to give the operator the choice of the second B-th toothed wheel on which to carry out the setting mode. In this case, the electronic controller 40 will ask the user to specify the toothed wheel 11 on which the setting mode is carried out, or had been carried out, or it will infer it from the comparison between the second actual command value $H_B$ and the nominal command values $Q_i$.

The electronic controller 40 then proceeds to compute, in a step 140, the actual command value $H_i$, at least for all of the other toothed wheels (with i<>A and i<>B), based on the nominal command values $Q_i$ stored in table 60, and on said first and second actual command value $H_A$, $H_B$ determined as described above and stored in table 70. In FIG. 8, block 130 indicates the step of determining or acquiring the nominal command values $Q_i$, in particular by reading them from table 60.

In the preferred embodiment, the computation of the actual command values $H_i$ is carried out by imposing that the difference $H_x - H_y$ in actual command values associated with a pair of toothed wheels is proportional to the difference in the nominal command values $Q_x - Q_y$ associated with such a pair of toothed wheels.

Preferably, the proportionality constant is equal to the ratio between the difference $H_A - H_B$ between the actual command values associated with said first and said second toothed wheel, detected as described above in steps 110 and 120, and the difference $Q_A-Q_B$ between the nominal command values associated with such two toothed wheels.

Alternatively, it is possible for example to use transformations that use equations of the second order or of a higher order.

In a preferred embodiment, the electronic controller 40 more specifically in a step 150 takes care of computing, for each toothed wheel 11, the following ratio, indicated as "transformation coefficient" in the following:

$$G_i=[Q_i-Q_{i-1}]/[Q_B-Q_A], \text{ with } Q_0=0 \qquad (1).$$

The numerator represents the difference between the nominal command value $Q_i$ associated with the involved toothed wheel and the nominal command value $Q_{i-1}$ associated with the toothed wheel immediately preceding it assumed to be equal to zero in the case of absence of a toothed wheel immediately preceding it (namely for the toothed wheel having the smallest diameter the numerator is simply the nominal command value $Q_i$ associated with the toothed wheel having the smallest diameter), while the denominator represents the difference in nominal command values associated with the second and with the first toothed wheel on which the detections have been carried out, namely the A-th toothed wheel and the B-th toothed wheel.

Advantageously, said ratios or transformation coefficients $G_i$ are computed one-off and then stored in a table 80, shown in FIG. 5, which similarly to tables 60 and 70 can lack the index field i and that will be accessible to the electronic controller 40, for example stored in the memory 44.

The electronic controller 40 then, in a step 160, takes care of computing, for each toothed wheel, possibly excluding the first A-th toothed wheel and the second B-th toothed wheel on which the detections in steps 110 and 120 have been carried out, the actual command value $H_i$ as the following algebraic sum:

$$H_i=H_{i-1}+G_i*[H_B-H_A], \text{ with } H_0=0 \qquad (2)$$

The addendum $H_{i-1}$ represents the actual command value associated with the toothed wheel immediately preceding it, assumed to be equal to zero in the case of absence of an immediately preceding toothed wheel (namely, for the toothed wheel having the smallest diameter), while the second addendum represents the product between the transformation coefficient $G_i$ computed in step 150 according to formula (1), and the difference $H_B-H_A$ between the actual command values associated with the first A-th toothed wheel and with the second B-th toothed wheel, detected in steps 110 and 120 as described above.

It can easily be demonstrated that for any pair of toothed wheels the following relationship holds true:

$$[H_x-H_y]/[Q_x-Q_y]=[H_B-H_A]/[Q_B-Q_A] \qquad (3)$$

Namely, as stated above, the difference $H_x-H_y$ in actual command values associated with a pair of toothed wheels is proportional to the difference in the nominal command values $Q_x-Q_y$ associated with such a pair of toothed wheels, the proportionality constant being equal to the ratio between the difference $H_A-H_B$ between the actual command values associated with the first A-th toothed wheel and with the second B-th toothed wheel, detected as described above in steps 110, 120, and the difference $Q_A-Q_B$ between the nominal command values associated with such two toothed wheels.

Indeed:

$$H_x-H_y=H_x-H_{x-1}+H_{x-1}-H_{x-2}+\ldots+H_{y+1}-H_y=G_x*[H_B-H_A]+G_{x-1}*[H_B-H_A]+\ldots+G_{y+1}*[H_B-H_A]=\ldots=[H_B-H_A]/[Q_B-Q_A]*(Q_x-Q_{x-1}+Q_{x-1}-Q_{x-2}+\ldots+Q_{y+1}-Q_y)=[H_B-H_A]/[Q_B-Q_A]*(Q_x-Q_y)$$

Preferably, the origin of the reference system for the nominal values $Q_i$ and the origin of the reference system for the actual values $H_i$ are selected at the first A-th toothed wheel, namely $H_A=0$ and $Q_A=0$.

Such a provision allows the computations to be simplified, because the difference in command values, nominal and actual, associated with the first A-th toothed wheel and with the second B-th toothed wheel coincides with the command value, nominal and actual respectively, associated with the second B-th toothed wheel.

Therefore, there can be a conversion step of the table 60 of the nominal command values $Q_i$ into a table 65 of "normalized" nominal command values $S_i$, where $$S_i=Q_i-Q_A \qquad (4)$$

Such a table 65 is shown in FIG. 6 and the same considerations outlined regarding table 60 of FIG. 3 also apply to it.

The transformation coefficients $G_i$ can then be computed, without distinction, from the nominal command values $Q_i$ of table 60 according to formula (1) given above, or from the normalized nominal command values $S_i$ of table 65, according to the following formula $$G_i=[S_i-S_{i-1}]/[S_B-S_A], \text{ with } S_0=0 \qquad (5).$$

During step 120 of detecting the second actual command value $H_B$ associated with the B-th toothed wheel and storing it in table 70, the value detected by the electronic controller 40 preferably has the first actual command value $H_A$ associated with the A-th toothed wheel, which had been stored in the table 70, subtracted from it; the first actual command value $H_A$ associated with the A-th toothed wheel and stored in table 70 is then set to zero. Alternatively, it is possible to use a suitable table of normalized actual values $K_i$, such as the table 75 shown in FIG. 7, for which the same considerations outlined regarding table 60 of FIG. 3 apply.

The "normalized" actual command values $K_i$ are correlated to the actual command values $H_i$ by the following relationship (6):

$$K_i=H_i-H_A \qquad (6)$$

It is easy to check that for the first A-th toothed wheel and the second B-th toothed wheel, the actual command value $K_A$, $K_B$ computed according to formula (2) and normalized according to formula (4) coincides with the detected value. Indeed, for the first A-th toothed wheel the following applies:

$$H_A=H_{A-1}+G_A*[H_B-H_A]=H_{A-2}+G_{A-2}*[H_B-H_A]+G_A*[H_B-H_A]+H_{A-2}+[G_{A-2}+G_A]*[H_B-H_A]=\ldots=H_0+[G_1+\ldots+G_{A-2}+G_A]*[H_B-H_A]$$

wherein, in the sum of the "transformation coefficients" $G_i$, the terms progressively simplify as follows $$G_1+\ldots+G_{A-2}+G_A=[Q_1-Q_0+\ldots+Q_{A-1}-Q_{A-2}+Q_A+Q_{A-1}]/[Q_B-Q_A]=[Q_A]/[Q_B-Q_A]$$

Therefore, one gets $H_A=[Q_A]*[H_B-H_A]/[Q_B-Q_A]$, which is an identity if one considers that with the normalization the values $H_A$ and $Q_A$ are both brought to zero.

For the second B-th toothed wheel, one gets the identity $$H_B=H_{B-1}+G_B*[H_B-H_A]=H_{B-2}+[G_{B-1}+G_B]*[H_B-H_A]=\ldots=H_A+[G_{A+1}+\ldots+G_{B-1}+G_B]*[H_B-H_A]=H_A+1*[H_B-H_A]=H_B$$

wherein, in the sum of the "transformation coefficients" $G_i$, the terms are progressively simplified as follows $$G_{A+1}+\ldots+G_{B-1}+G_B=[Q_{A+1}-Q_A+\ldots+Q_{B-1}-Q_{B-2}+Q_B-Q_{B-1}]/[Q_B-Q_A]=[Q_B-Q_A]/[Q_B-Q_A]=1$$

The computations of formulae (1) and (2) relative to the first A-th toothed wheel and to the second B-th toothed wheel to obtain the transformation coefficient $G_A$ and the transformation coefficient $G_B$ and the actual command values $H_A$ and $H_B$ associated with the first A-th toothed wheel and with the second B-th toothed wheel can therefore be omitted. It is however advantageous to include them, so as to be able to easily parameterize the computation of the actual command values $H_i$ and increase the flexibility of application of the method of the invention, for example in the selection of the first and second toothed wheel, in the number of toothed wheels etc.

Although shown as distinct tables for the sake of greater clarity, the nominal and actual command values of the tables 60, 65, 70, 75 and/or 80 could also be stored in a common data structure.

In a further alternative embodiment, the table 60, 65 of the nominal command values $Q_i$, $S_i$, normalized and not, could be absent, the transformation coefficients $G_i$ being provided directly, based on which to compute the actual command values $H_i$ in the aforementioned way. In the absence of a valid computation, however, the electronic control unit should obtain the nominal command values from such transformation coefficients $G_i$.

It should be understood that while it has been assumed that the command values, nominal and actual, are increasing for toothed wheels having increasing diameter, they can be selected as increasing for toothed wheels having decreasing diameter, the changes to be made to the above being manifest.

The method outlined above can be implemented in a controller marketed together with a derailleur, but independently of the toothed wheels, the chain and the other components of a gearshift.

EXAMPLES

Merely as an example, hereinafter a numerical example relative to a gearshift group having eleven toothed wheels is given, in order to allow the invention to be appreciated quantitatively.

In the following table I, for each toothed wheel the following are given:

the nominal command values $Q_i$, expressed in this case as the difference in length in millimeters of the diagonal of the articulated parallelogram of the derailleur, with respect to a reference coinciding with the positioning of the chain in engagement with the toothed wheel having the smallest diameter;

the "normalized" nominal command values $S_i$ with respect to the toothed wheel immediately adjacent to the one having the smallest diameter, namely the toothed wheel with index i=2 represents the first A-th toothed wheel on which to carry out the detection;

the transformation coefficients $G_i$, computed without distinction according to formula (1) or formula (5).

TABLE I

| Toothed wheel i | Nominal command value $Q_i$ [mm] | "Normalized" nominal command value $S_i$ [mm] | Transformation coefficient $G_i$ |
|---|---|---|---|
| 1 | 0 | −1.86 | −0.167718665 |
| A = 2 | 1.86 | 0 | 0.167718665 |
| 3 | 3.43 | 1.57 | 0.141568981 |
| 4 | 4.96 | 3.1 | 0.137962128 |
| 5 | 6.43 | 4.57 | 0.132551849 |
| 6 | 7.83 | 5.97 | 0.126239856 |
| 7 | 9.18 | 7.32 | 0.121731289 |
| 8 | 10.49 | 8.63 | 0.118124436 |
| 9 | 11.74 | 9.88 | 0.112714157 |
| B = 10 | 12.95 | 11.09 | 0.109107304 |
| 11 | 14.11 | 12.25 | 0.104598738 |

In the following tables II and III, numerical simulations relative to some real, mounted gearshift groups, are given. Different geometries of the derailleur and of the sprocket assembly and different sizes within the respective tolerances have been simulated.

For each gearshift group, table II indicates the differences in length in millimeters of the diagonal of the articulated parallelogram of the derailleur with respect to a reference coinciding with the positioning of the chain in engagement with the toothed wheel having the smallest diameter, and table III indicates such distances "normalized" with respect to the toothed wheel of index i=2.

TABLE II

| Toothed wheel i | Gearshift group 1 Distance [mm] | Gearshift group 2 Distance [mm] | Gearshift group 3 Distance [mm] | Gearshift group 4 Distance [mm] | Gearshift group 5 Distance [mm] |
|---|---|---|---|---|---|
| 1 | 0 | 0 | 0 | 0 | 0 |
| A = 2 | 1.89 | 1.88 | 1.87 | 1.84 | 1.83 |
| 3 | 3.5 | 3.47 | 3.45 | 3.4 | 3.38 |
| 4 | 5.05 | 5.02 | 4.99 | 4.93 | 4.89 |
| 5 | 6.54 | 6.5 | 6.46 | 6.38 | 6.34 |
| 6 | 7.97 | 7.93 | 7.88 | 7.78 | 7.73 |
| 7 | 9.34 | 9.29 | 9.24 | 9.13 | 9.07 |
| 8 | 10.67 | 10.61 | 10.55 | 10.42 | 10.36 |
| 9 | 11.94 | 11.87 | 11.81 | 11.67 | 11.6 |
| B = 10 | 13.16 | 13.09 | 13.02 | 12.87 | 12.8 |
| 11 | 14.34 | 14.27 | 14.19 | 14.03 | 13.95 |

TABLE III

| Toothed wheel i | Gearshift group 1 "Normalized" distance [mm] | Gearshift group 2 "Normalized" distance [mm] | Gearshift group 3 "Normalized" distance [mm] | Gearshift group 4 "Normalized" distance [mm] | Gearshift group 5 "Normalized" distance [mm] |
|---|---|---|---|---|---|
| 1 | −1.89 | −1.88 | −1.87 | −1.84 | −1.83 |
| A = 2 | 0 | 0 | 0 | 0 | 0 |
| 3 | 1.61 | 1.59 | 1.58 | 1.56 | 1.55 |
| 4 | 3.16 | 3.14 | 3.12 | 3.09 | 3.06 |

TABLE III-continued

| Toothed wheel i | Gearshift group 1 "Normalized" distance [mm] | Gearshift group 2 "Normalized" distance [mm] | Gearshift group 3 "Normalized" distance [mm] | Gearshift group 4 "Normalized" distance [mm] | Gearshift group 5 "Normalized" distance [mm] |
|---|---|---|---|---|---|
| 5 | 4.65 | 4.62 | 4.59 | 4.54 | 4.51 |
| 6 | 6.08 | 6.05 | 6.01 | 5.94 | 5.9 |
| 7 | 7.45 | 7.41 | 7.37 | 7.29 | 7.24 |
| 8 | 8.78 | 8.73 | 8.68 | 8.58 | 8.53 |
| 9 | 10.05 | 9.99 | 9.94 | 9.83 | 9.77 |
| B = 10 | 11.27 | 11.21 | 11.15 | 11.03 | 10.97 |
| 11 | 12.45 | 12.39 | 12.32 | 12.19 | 12.12 |

For each gearshift group from 1 to 5 it has been simulated to carry out a detection by selecting, as stated above, the toothed wheel of index i=2 as the first A-th toothed wheel (A=2) and the toothed wheel immediately adjacent to the one with the maximum diameter, namely the one with index i=10, as the second B-th toothed wheel (B=10). The origin of the reference system was also set on the A-th toothed wheel. The values $K_A = H_{2=0}$ and $K_B = H_2$ are highlighted in table III above.

In table IV below, for each gearshift group from 1 to 5 there are given the normalized actual command values $K_i$ computed according to the formulae (2) and (6) based on the values $K_A$ and $K_B$ given in table III and on the transformation coefficients $G_i$ given in table I.

TABLE IV

| Toothed wheel i | Gearshift group 1 "Normalized" actual command value $K_i$ [mm] | Gearshift group 2 "Normalized" actual command value $K_i$ [mm] | Gearshift group 3 "Normalized" actual command value $K_i$ [mm] | Gearshift group 4 "Normalized" actual command value $K_i$ [mm] | Gearshift group 5 "Normalized" actual command value $K_i$ [mm] |
|---|---|---|---|---|---|
| 1 | −1.89018936 | −1.88012624 | −1.87006312 | −1.84993688 | −1.83987376 |
| 2 | 0 | 0 | 0 | 0 | 0 |
| 3 | 1.595482417 | 1.586988278 | 1.578494139 | 1.561505861 | 1.553011722 |
| 4 | 3.1503156 | 3.133543733 | 3.116771867 | 3.083228133 | 3.066456267 |
| 5 | 4.644174932 | 4.619449955 | 4.594724977 | 4.545275023 | 4.520550045 |
| 6 | 6.066898106 | 6.034598738 | 6.002299369 | 5.937700631 | 5.905401262 |
| 7 | 7.438809739 | 7.399206492 | 7.359603246 | 7.280396754 | 7.240793508 |
| 8 | 8.770072137 | 8.723381425 | 8.676690712 | 8.583309288 | 8.536618575 |
| 9 | 10.04036069 | 9.986907124 | 9.933453562 | 9.826546438 | 9.773092876 |
| 10 | 11.27 | 11.21 | 11.15 | 11.03 | 10.97 |
| 11 | 12.44882777 | 12.38255185 | 12.31627592 | 12.18372408 | 12.11744815 |

It can immediately be seen that the "normalized" actual command values $K_i$ relative to the toothed wheels of index A=2 and of index B=10 given in table IV are identical to the values given, for such toothed wheels, in table III. It can also be seen that the "normalized" actual command values $K_i$ relative to the other toothed wheels given in table IV are very close to the "real" values given, for such toothed wheels, in table III. The following table V gives the positioning error for each toothed wheel, namely the difference between the "normalized" actual command value $K_i$ computed and the "real" value of the corresponding simulation. Of course, the error is zero at the first and second toothed wheel of index A=2 and of index B=10. It is noted that the error is extremely small, with a maximum value of less than 2 hundredths of a millimeter for the toothed wheel of index 6 of gearshift group 2.

TABLE V

| Toothed wheel | Gearshift group 1 Error [mm] | Gearshift group 2 Error [mm] | Gearshift group 3 Error [mm] | Gearshift group 4 Error [mm] | Gearshift group 5 Error [mm] |
|---|---|---|---|---|---|
| 1 | −0.0001894 | −0.0001262 | −0.0000631 | −0.0099369 | −0.0098738 |
| 2 | 0.0000000 | 0.0000000 | 0.0000000 | 0.0000000 | 0.0000000 |
| 3 | −0.0145176 | −0.0030117 | −0.0015059 | 0.0015059 | 0.0030117 |
| 4 | −0.0096844 | −0.0064563 | −0.0032281 | −0.0067719 | 0.0064563 |
| 5 | −0.0058251 | −0.0005500 | 0.0047250 | 0.0052750 | 0.0105500 |
| 6 | −0.0131019 | −0.0154013 | −0.0077006 | −0.0022994 | 0.0054013 |
| 7 | −0.0111903 | −0.0107935 | −0.0103968 | −0.0096032 | 0.0007935 |
| 8 | −0.0099279 | −0.0066186 | −0.0033093 | 0.0033093 | 0.0066186 |
| 9 | −0.0096393 | −0.0030929 | −0.0065464 | −0.0034536 | 0.0030929 |
| 10 | 0.0000000 | 0.0000000 | 0.0000000 | 0.0000000 | 0.0000000 |
| 11 | −0.0011722 | −0.0074482 | −0.0037241 | −0.0062759 | −0.0025518 |

What is claimed is:

1. Method for electronically controlling a bicycle gearshift, comprising the steps of:
   a) detecting, by a controller, a first actual command value of an actuator such as to position a motion transmission chain in engagement with a first of at least three coaxial toothed wheels, and a second actual command value of the actuator such as to position the chain in engagement with a second of said at least three coaxial toothed wheels,
   b) for each of said at least three coaxial toothed wheels, determining a nominal command value of the actuator theoretically such as to position the chain in engagement with said each one of said at least three coaxial toothed wheels, and
   c) computing at least a third actual command value of said actuator at least for each of said at least three coaxial toothed wheels other than the first and second toothed wheel, based on said nominal command values and on said first and second actual command value.

2. Method according to claim 1, wherein said step of determining a nominal command value of the actuator comprises reading a table of values from a memory.

3. Method according to claim 1 wherein said computation of at least the third actual command value is carried out by imposing that the difference in two of said first, second, and at least the third actual command values associated with a pair of toothed wheels is proportional to the difference in the nominal command values associated with said pair of toothed wheels.

4. Method according to claim 3, wherein a proportionality constant is equal to the ratio between the difference in said first and second actual command values associated with said first and said second toothed wheel and the difference in nominal command values associated with said first and said second toothed wheel.

5. Method according to claim 1, wherein said first toothed wheel is the toothed wheel with the smallest diameter or the one immediately adjacent to the toothed wheel with the smallest diameter and/or said second toothed wheel is the toothed wheel with the largest diameter or the one immediately adjacent to the toothed wheel with the largest diameter.

6. Method according to claim 1, wherein an origin of a reference system for the nominal command values and an origin of a reference system for the actual command values are selected at said first toothed wheel.

7. Method according to claim 1, wherein said step c) comprises the steps of:
   d) computing, for each of said at least three coaxial toothed wheels possibly excluding said first and said second toothed wheel, the ratio between (i) the difference between the nominal command value associated with the toothed wheel for which the ratio is computed and the nominal command value associated with the toothed wheel immediately preceding the toothed wheel for which the ratio is computed assumed to be equal to zero in the case of absence of a toothed wheel immediately preceding the toothed wheel for which the ratio is computed and (ii) the difference in nominal command values associated with said second and said first toothed wheel;
   e) computing, for each of said at least three coaxial toothed wheels possibly excluding said first and said second toothed wheel, the algebraic sum between (i) one of said first, second, and at least the third actual command values, associated with the toothed wheel immediately preceding the toothed wheel for which the algebraic sum is computed, assumed to be equal to zero in the case of absence of a toothed wheel immediately preceding the toothed wheel for which the algebraic sum is computed, and (ii) the product between the ratio computed in step d) and the difference between the first and second actual command values associated with said second and said first toothed wheel detected in step a).

8. Method according to claim 1 wherein said steps a)-c) are comprised in a setting or adjustment operating mode of the gearshift, while in a ride operating mode, the electronic controlling method comprises the step of actuating a gearshifting by commanding the actuator according to one of said first, second, and at least the third actual command values.

9. Method according to claim 8, comprising the step, in the ride operating mode, of actuating a gearshifting by commanding the actuator according to one of said nominal command values in the absence of a valid set of said first, second, and at least the third actual command values.

10. Electronically servo-assisted bicycle gearshift, comprising:
   a chain and toothed wheels system for transmitting motion from an axle of the pedal cranks to a driving wheel of the bicycle, said system for transmitting motion comprising at least three coaxial toothed wheels along an axis selected among the axle of the pedal cranks and an axis of the driving wheel;
   at least one derailleur comprising a chain guide element and an actuator of the chain guide element to displace the chain into engagement with a preselected toothed wheel of said at least three coaxial toothed wheels, and
   control electronics comprising modules adapted to:
   a) detect a first actual command value of the actuator such as to position the chain in engagement with a first of said at least three coaxial toothed wheels, and a second actual command value of the actuator such as to position the chain in engagement with a second of said at least three coaxial toothed wheels,
   b) for each of said at least three coaxial toothed wheels, determine a nominal command value of the actuator theoretically such as to position the chain in engagement with said each one of said at least three coaxial toothed wheels, and
   c) compute at least one third actual command value of said actuator at least for each of said at least three coaxial toothed wheels other than the first and second toothed wheel, respectively, based on said nominal command values and on said first and second actual command value.

11. Gearshift according to claim 10, wherein said actuator comprises a direct current brush motor driven by a suitable number of steps, each step corresponding to a fraction of a revolution, more preferably to one thirty-secondth of a revolution.

12. Bicycle derailleur, comprising a chain guide element and an actuator of the chain guide element to displace a chain into engagement with a preselected toothed wheel of at least three coaxial toothed wheels, and control electronics comprising modules adapted to:
   a) detect a first actual command value of the actuator such as to position the chain in engagement with a first of said least three coaxial toothed wheels, and a second actual command value of the actuator such as to position the chain in engagement with a second of said at least three coaxial toothed wheels,
   b) for each of said at least three coaxial toothed wheels, determine a nominal command value of the actuator theoretically such as to position the chain in engagement with said each one of said at least three coaxial toothed wheels, and c) compute at least one third actual command value of said actuator at least for each of said at least three coaxial toothed wheels other than the first and second toothed wheel, respectively, based on said nominal command values and on said first and second actual command value.

\* \* \* \* \*